US012801372B2

(12) United States Patent
Fan

(10) Patent No.: US 12,801,372 B2
(45) Date of Patent: Nov. 17, 2026

(54) SOFTWARE UPGRADE METHOD AND ELECTRONIC DEVICE

(71) Applicant: SHENZHEN ZOLON TECHNOLOGY CO., LTD., Shenzhen (CN)

(72) Inventor: Jun Fan, Shenzhen (CN)

(73) Assignee: SHENZHEN ZOLON TECHNOLOGY CO., LTD., Shenzhen (CN)

( * ) Notice: Subject to any disclaimer, the term of this patent is extended or adjusted under 35 U.S.C. 154(b) by 263 days.

(21) Appl. No.: 18/722,596

(22) PCT Filed: Oct. 18, 2022

(86) PCT No.: PCT/CN2022/125969
§ 371 (c)(1),
(2) Date: Jun. 21, 2024

(87) PCT Pub. No.: WO2023/116150
PCT Pub. Date: Jun. 29, 2023

(65) Prior Publication Data
US 2025/0053409 A1 Feb. 13, 2025

(30) Foreign Application Priority Data
Dec. 22, 2021 (CN) ........................ 202111580790.1

(51) Int. Cl.
*G06F 8/65* (2018.01)
*G06F 21/44* (2013.01)

(52) U.S. Cl.
CPC ................ *G06F 8/65* (2013.01); *G06F 21/44* (2013.01)

(58) Field of Classification Search
CPC .................................. G06F 8/65; G06F 21/44
See application file for complete search history.

(56) References Cited

U.S. PATENT DOCUMENTS 10,521,214 B2 * 12/2019 Cooper .................. G06F 21/12
10,747,510 B1 * 8/2020 Lundeen .................. G06F 8/44
(Continued)

FOREIGN PATENT DOCUMENTS

CN 102081536 6/2011
CN 107493186 12/2017
(Continued)

*Primary Examiner* — Jay A Morrison
(74) *Attorney, Agent, or Firm* — ScienBiziP, P.C.

(57) ABSTRACT

The present application is applicable to a field of computer application technology, and provides a software upgrade method, device and electronic device. The method includes: after receiving an upgrade request sent by a service platform, sending an upgrade query instruction to a transaction terminal; receiving a query result fed back by the transaction terminal, the query result being generated by executing the upgrade query instruction on the transaction terminal using a software tool development kit integrated in the software to be upgraded; and determining whether to upgrade the software to be upgraded in the transaction terminal according to the query result. Through the present application, a problem of data loss or software crash when upgrading software during a transaction can be solved, and the reliability and flexibility of software upgrades can be improved.

16 Claims, 5 Drawing Sheets

(56) References Cited

U.S. PATENT DOCUMENTS

| | | | | |
|---|---|---|---|---|
| 2006/0080656 | A1* | 4/2006 | Cain | G06F 8/65<br>434/118 |
| 2015/0007157 | A1* | 1/2015 | Park | G06F 8/65<br>717/170 |
| 2015/0227354 | A1* | 8/2015 | Wang | G06F 8/65<br>717/169 |
| 2015/0363210 | A1* | 12/2015 | Wehrman | G06F 8/65<br>701/31.5 |
| 2022/0244947 | A1* | 8/2022 | Schober | G06F 21/71 |

FOREIGN PATENT DOCUMENTS

| | | |
|---|---|---|
| CN | 109766108 | 5/2019 |
| CN | 112256299 | 1/2021 |

* cited by examiner (a)

(b)

SOFTWARE UPGRADE METHOD AND ELECTRONIC DEVICE

This application claims priority to Chinese Patent Application No. 202111580790.1 filed on Dec. 22, 2021, in China National Intellectual Property Administration, the contents of which are incorporated by reference herein.

FIELD

The subject matter herein generally relates to a technology field of computer application, in particular, relates to a software upgrade method, a software upgrade device and an electronic device.

BACKGROUND

With a development of the Internet, mobile payment has spread throughout every corner of life, and payment terminals also support increasingly rich transaction software.

At present, on one transaction terminal, since the transaction software is often in the process of customer transaction or payment, transaction data is extremely important to the transaction software. During an execution process of the customer transaction or payment, rushing to upgrade the transaction software on the transaction terminal will cause a loss of transaction data, or cause a running transaction software to crash.

SUMMARY

The present application provides a software upgrade method, a software upgrade device and an electronic device, which can solve a problem of data loss or software crash when upgrading a software during a transaction process.

In a first aspect, the present application provides the software upgrade method, the method includes:

after receiving an upgrade request sent by a service platform, sending an upgrade query instruction to a transaction terminal;

receiving a query result fed back by the transaction terminal, the query result being generated by executing the upgrade query instruction on the transaction terminal using a software tool development kit integrated in the software to be upgraded; and determining whether to upgrade the software to be upgraded in the transaction terminal according to the query result.

In a possible implementation of the first aspect, the upgrade request includes an upgraded version of the software to be upgraded, after receiving the upgrade request sent by the service platform, the method further includes:

according to one or more upgrade requests, downloading an installation package of the upgraded version corresponding to each upgrade request respectively;

according to an application package name of the software to be upgraded, querying the software to be upgraded on the transaction terminal;

invoking a query interface corresponding to the software to be upgraded, and sending the upgrade query instruction to the transaction terminal;

wherein the installation package is used to upgrade the software to be upgraded in the transaction terminal according to a unified installation interface.

In a possible implementation of the first aspect, the query result comprises a response result and an authentication credential, determining whether to upgrade the software to be upgraded in the transaction terminal according to the query result further includes:

verifying the authentication credential by invoking an authentication interface of the service platform;

in response that the authentication credential passes, determining whether to upgrade the software to be upgraded in the transaction terminal according to the response result;

in response that the authentication credential fails, upgrading the software to be upgraded in the transaction terminal;

wherein the response result and the authentication credential are respectively generated by the transaction terminal according to the cross-process interaction method and the credential generation method in the software tool development kit.

In a possible implementation of the first aspect, determining whether to upgrade the software to be upgraded in the transaction terminal according to the query result further includes:

in response that the response result indicates to update, upgrading the software to be upgraded in the transaction terminal;

in response that the response result indicates not to update, starting a multiple inquiry mechanism, which is used to send the upgrade inquiry instruction to the transaction terminal again after a preset time.

In a possible implementation of the first aspect, upgrading the software to be upgraded in the transaction terminal further includes:

calculating a difference in binary data between an installation package of the upgraded version and an installation package of an older version corresponding to the software to be upgraded by a binary file difference algorithm;

generating a difference file according to the difference in binary data, wherein the difference file is used to instruct the transaction terminal to synthesize an upgrade installation package according to the installation package of the old version and the difference file, and upgrade the software to be upgraded according to the upgrade installation package.

In a possible implementation of the first aspect, further including:

sending the upgrade query instruction to the transaction terminal by a first thread according to a cross-process communication;

verifying an authentication credential in the query result and determining whether to upgrade the software to be upgraded by using a second thread;

wherein the second thread is a process that downloads the installation package of the upgraded version before the first thread.

In a second aspect, the present application provides a software upgrade method, the method including:

receiving an upgrade query instruction sent by a client for a software to be upgraded, wherein the upgrade query instruction is generated by the client after receiving the upgrade request sent by a service platform;

invoking a software tool development kit integrated in the software to be upgraded, and executing the upgrade query instruction, and generating a query result;

sending the query result to the client, wherein the query result is used to instruct the client to determine whether to upgrade the software to be upgraded.

In a possible implementation of the second aspect, a software development kit also includes an authentication key, and the query result comprises a response result and an authentication credential;

invoking the software tool development kit integrated in the software to be upgraded, and executing the upgrade query instruction, and generating the query result further comprises:

invoking a cross-process interaction method in the software tool development kit, and executing the upgrade query instruction, and generating the response result;

invoking a credential generation method in the software tool development kit, and generating the authentication credential according to the authentication key;

wherein the authentication key is generated by the service platform for a development software, and the authentication credential is used by the client to verify a older version of the software to be upgraded, and the response result is used by the client to determine whether to upgrade the software to be upgraded after the authentication credential corresponding to the older version is verified.

In a third aspect, an embodiment of the present application provides a software upgrade device, the device includes:

a sending unit, configured to send an upgrade inquiry instruction to a transaction terminal after receiving an upgrade request sent by a service platform;

a receiving unit, configured to receive a query result query result fed back by the transaction terminal, wherein the query result is generated by executing the upgrade inquiry instruction on the transaction terminal using a software tool development kit integrated in the software to be upgraded;

a processing unit, configured to determine whether to upgrade the software to be upgraded in the transaction terminal according to the query result.

In a fourth aspect, an embodiment of the present application provides an electronic device, the device includes a memory, a processor, and a computer program stored in the memory and executable on the processor, wherein, when the processor executes the computer program, the method described in the first aspect or the second aspect is implemented.

In a fifth aspect, an embodiment of the present application provides a computer-readable storage medium, and the computer-readable storage medium stores a computer program, and when the computer program is executed by a processor, the method described in the first aspect or the second aspect is implemented.

In a sixth aspect, an embodiment of the present application provides a computer program product, which, when executed on a terminal device, enables the terminal device to execute the method described in the above first or second aspect.

It can be understood that beneficial effects of the second to sixth aspects mentioned above can be found in the relevant description of the first aspect and will not be repeated here.

Compared with the prior art, the present application has following beneficial effects: in the embodiment of the present application, after receiving the upgrade request sent by the service platform, the client sends the upgrade inquiry instruction to the transaction terminal; the client receives the query result fed back by the transaction terminal, and the query result is generated by the trading terminal according to the upgrade query instruction through the software tool development kit integrated in the software to be upgraded; the client determines whether to upgrade the software to be upgraded in the transaction terminal according to the query result; the client inquires the transaction terminal and the transaction terminal generates the query result and responds through the software tool development kit, and the client decides whether to upgrade according to the query result, which can realize flexible upgrading of the software to be upgraded in the transaction terminal, and can avoid upgrading the software during the transaction process, thereby avoiding data loss and software crash caused by software upgrade during the transaction process, and improving the reliability and applicability of software upgrade, and having strong ease of use and practicality.

BRIEF DESCRIPTION OF THE DRAWINGS

In order to explain technical solutions of the embodiments of the present application more clearly, the drawings needed to be used in the description of the embodiments of the present application will be briefly introduced below. Obviously, the drawings in the following description are only some embodiments of the present application, for those of ordinary skill in the art, other drawings can also be obtained based on these drawings without exerting creative labor.

DETAILED DESCRIPTION

Figure 1:
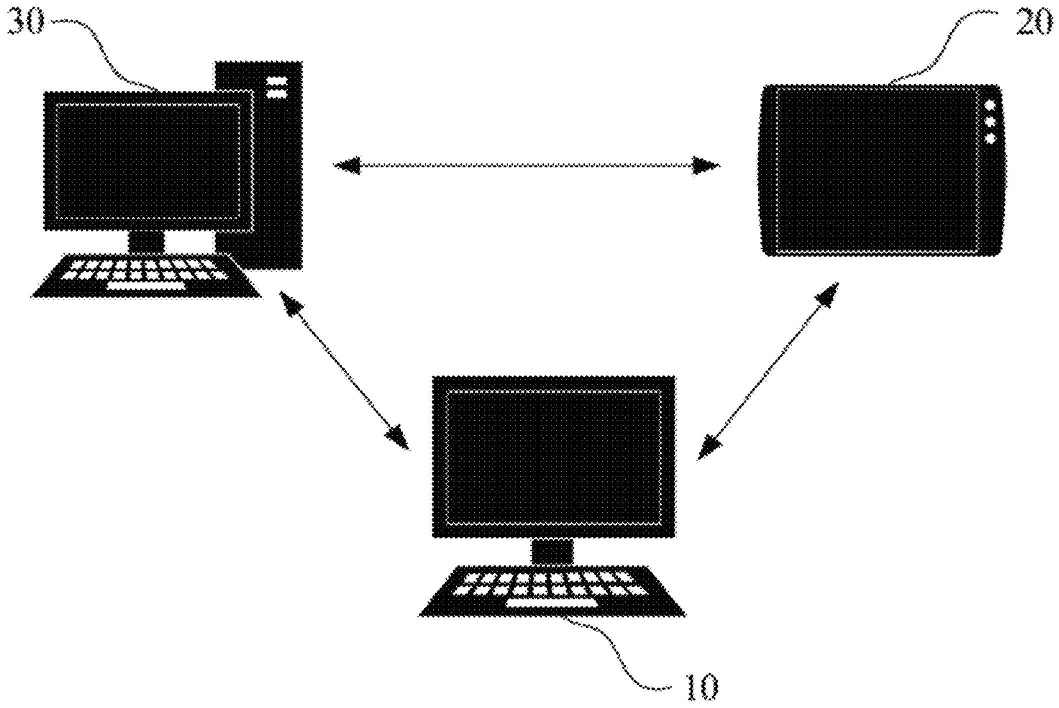
FIG. 1 is a schematic architectural diagram of a system application scenario provided by an embodiment of the present application.

In the following description, for the purpose of explanation rather than limitation, specific details such as specific system structures and technologies are illustrated to provide a thorough understanding of the embodiments of the present application. However, it will be apparent to those skilled in the art that the present application may be practiced in other embodiments without these specific details. In other embodiments, detailed descriptions of well-known systems, devices, circuits, and methods are omitted so as not to obscure the description of the present application with unnecessary detail.

It will be understood that, when used in the specification and the appended claims, the term “comprising” indicates the presence of the described features, integers, steps, operations, elements and/or components but does not exclude one or more other presence or addition of features, integers, steps, operations, elements, components and/or collections thereof.

It should also be understood that the term "and/or" used in the present specification and the appended claims refers to any combination and all possible combinations of one or more of the associated listed items, and includes these combinations.

As used in the present specification and the appended claims, the term "if" can be interpreted as "when" or "once" or "in response to determining" or "in response to detecting" according to the context. Similarly, the phrase "if it is determined" or "if [described condition or event] is detected" can be interpreted as meaning "once it is determined" or "in response to determining" or "once [described condition or event] is detected" or "in response to detecting [described condition or event]" according to the context.

In addition, in the description of the present application specification and the appended claims, the terms "first", "second", "third", etc. are only used to distinguish the descriptions and cannot be understood as indicating or implying relative importance.

Reference "one embodiment" or "some embodiments" described in the present application specification means to include in one or more embodiments of the present application the specific features, structure or characteristics described in conjunction with the embodiment. Thus, the statements "in one embodiment", "in some embodiments", "in some other embodiments", "in some other embodiments" etc. that appear in the difference in the specification are not necessarily all with reference to the same embodiment, but mean "one or more but not all embodiments", unless otherwise particularly emphasized. Term "comprises", "includes", "has" and their deformation all mean "including but not limited to", unless otherwise particularly emphasized.

On the transaction terminal, since a lot of software (such as transaction applications) do not have corresponding background services, the software upgrade needs to be completed by the terminal management platform, and the transaction data is generally stored locally in the software. If the software is upgraded during the transaction process by using the software, it may cause data loss or software crash, thereby interrupting the user's current transaction process and the user experience is also very poor.

In view of the above problems, the embodiment of the present application provides a software upgrade method, which can be applied to a client of the application program for managing the transaction terminal. In one embodiment, the client of the application program for managing the transaction terminal can be a PAXSTORE client, and the PAXSTORE client can be running on a separate hardware device different from the transaction terminal, or can be an application program running on the transaction terminal. Before executing the software upgrade, a logic task of querying the upgrade and determining whether to upgrade based on the response is added. According to operating status of the transaction terminal, the upgrade process is flexibly controlled, for example, the client inquires whether the transaction application in the transaction terminal is in a transaction state, and if the transaction application is in a transaction state, a corresponding strategy will be activated, and the inquiry will continue when a next opportunity comes, otherwise the software upgrade will be executed.

Referring to FIG. 1, FIG. 1 is a schematic architecture diagram of a system application scenario provided by the embodiment of the present application. As shown in FIG. 1, the system includes a client 10, a transaction terminal 20 and a service platform 30. The client interacts with the transaction terminal 20 and the service platform 30 respectively, and the service platform 30 can also communicate with the transaction terminal 20.

In one embodiment, the client 10 manages the application programs on the transaction terminal 20, including remote installation and upgrade of software. The service platform 30 is a backend service terminal of the client 10, and is able to receive application programs developed and uploaded by a third party and push instructions input by a user who owns the transaction terminal. For example, after a third party logs in through the front-end web page interface of the service platform 30, the service platform 30 receives the newly developed or upgraded application programs uploaded by the third party; or after the user who owns the transaction terminal logs in through the front-end web page interface of the service platform 30, the service platform 30 receives the push instructions input by the user.

Exemplarily, after receiving the push instructions, the service platform 30 may send a push message to the client 10; after receiving the push message, the client 10 may download and install a new version of the software installation package from the service platform 30. Alternatively, after receiving the push instructions, the service platform 30 may also directly send the push message to the transaction terminal 20 to push the new version of the software; after receiving the push message, the transaction terminal 20 receives the update instruction input by the user and sends the update information to the client 10; after receiving the update information, the client 10 may download and install the new version of the software installation package from the service platform.

It should be noted that the service platform 30 can send push message to the client 10 or the transaction terminal 20 in real time, and push the new version of the application program in real time. Exemplarily, the service platform can be a PAXSTORE platform, and the transaction terminal can be a POS terminal. An owner agent of the transaction terminal can push the application to the client through the service platform (such as the PAXSTORE platform) to update an old version of the application in the transaction terminal.

In the embodiment of the present application, after receiving the push message sent by the service platform 30 or the update information sent by the transaction terminal 20, the client 10 starts to interact with the transaction terminal 20, inquires whether the transaction terminal 20 is in an upgradeable state, and determines whether to execute the upgrade process based on an query result fed back by the transaction terminal 20. Thereby, the flexibility of the software upgrade process is improved, and the defects of data loss or software flashback caused by the software being in the transaction process can be effectively avoided; the inquiry process, the determination process and the upgrade process are all realized through the background interaction between the client 10 and the transaction terminal 20, and are executed and completed without user awareness, which greatly improves user's use experience while ensuring a smooth progress of the transaction and the timeliness of the software upgrade.

Based on the above overview, a process of the software upgrade method provided by the present application is described in detail below. It should be noted that the client 10 in FIG. 1 can be used as an independent hardware device to execute corresponding process steps, for example, the program of the PAXSTORE client can be run on the client 10 to achieve the management of the transaction application on the transaction terminal 20. The client 10 can also be used as a code module of the application program integrated in the transaction terminal 20 (for example, the program code of the PAXSTORE client), and the transaction terminal is used as a execution subject to implement a function of managing the transaction application corresponding to the code module, for example, the program of the PAXSTORE client is run on the transaction terminal to achieve the management of the application on the transaction terminal 20.

Figure 2:
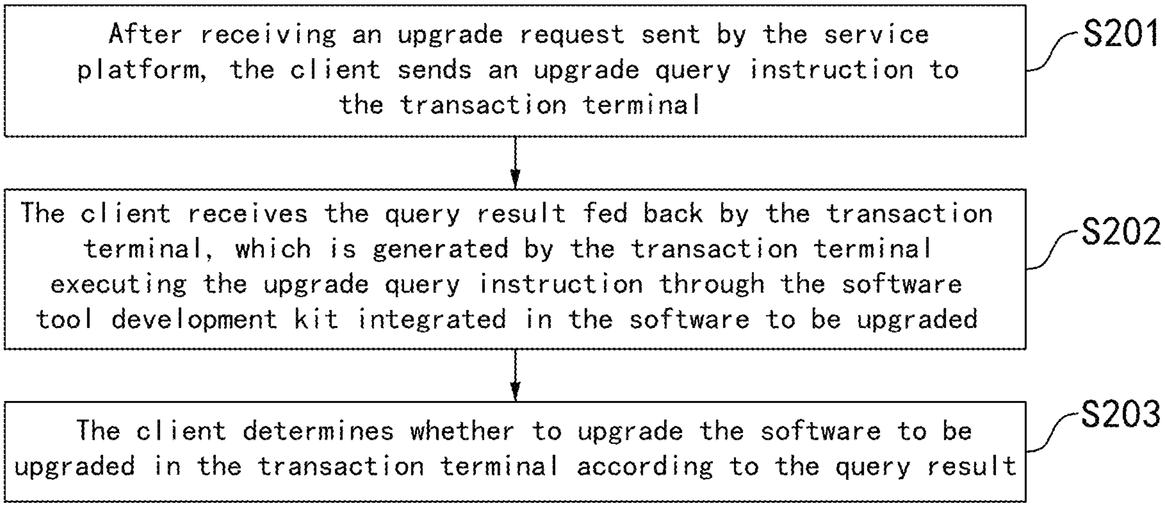
FIG. 2 is a schematic flow chart of a software upgrade method provided by an embodiment of the present application.

As shown in FIG. 2, a schematic flow diagram of the software upgrade method provided in the embodiment of the present application is illustrated. An execution subject of the method can be the client 10 in the system shown in FIG. 1. The execution subject can also be a transaction terminal that can implement client-related functions, that is, the execution subject can also be the transaction terminal 20 at this time, and the code module can be executed in the transaction terminal 20 to implement the corresponding functional steps of the client. For convenience of description, the embodiment of the present application takes the client 10 as an independent entity and is introduced as the execution subject of the embodiment of the present application. The method may include the following steps.

S201, after receiving an upgrade request sent by the service platform, the client sends an upgrade query instruction to the transaction terminal.

In some embodiments, the client may be a device responsible for managing applications of various transaction terminals, such as a PAXSTORE client; the client may also be a computing device such as a desktop computer, a notebook, a PDA, and a cloud server.

Exemplarily, the upgrade request may be sent by the service platform 30 in FIG. 1; or after the transaction terminal 20 in FIG. 1 triggers an update mechanism, the client receives the upgrade request sent by the service platform 30.

Figure 3:
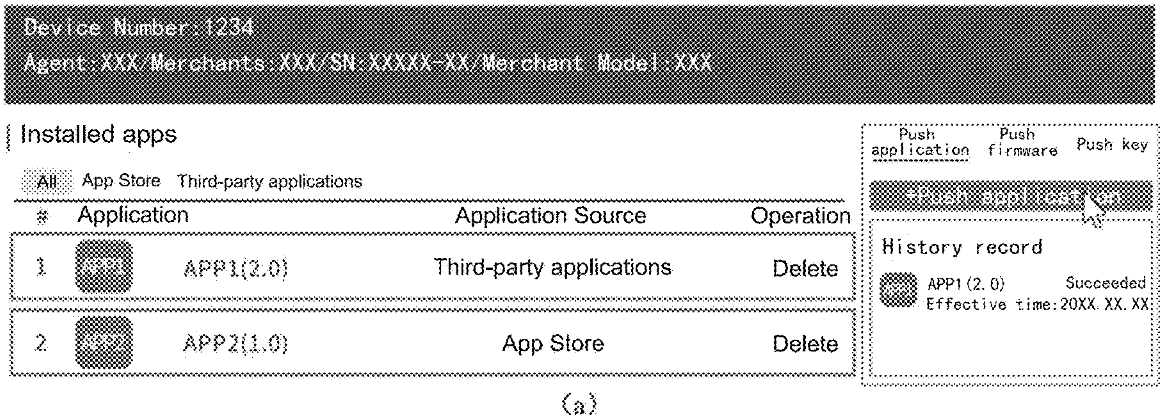
FIG. 3 is a schematic interface diagram of an application pushed by a service platform in an embodiment of the present application.
Figure 3:
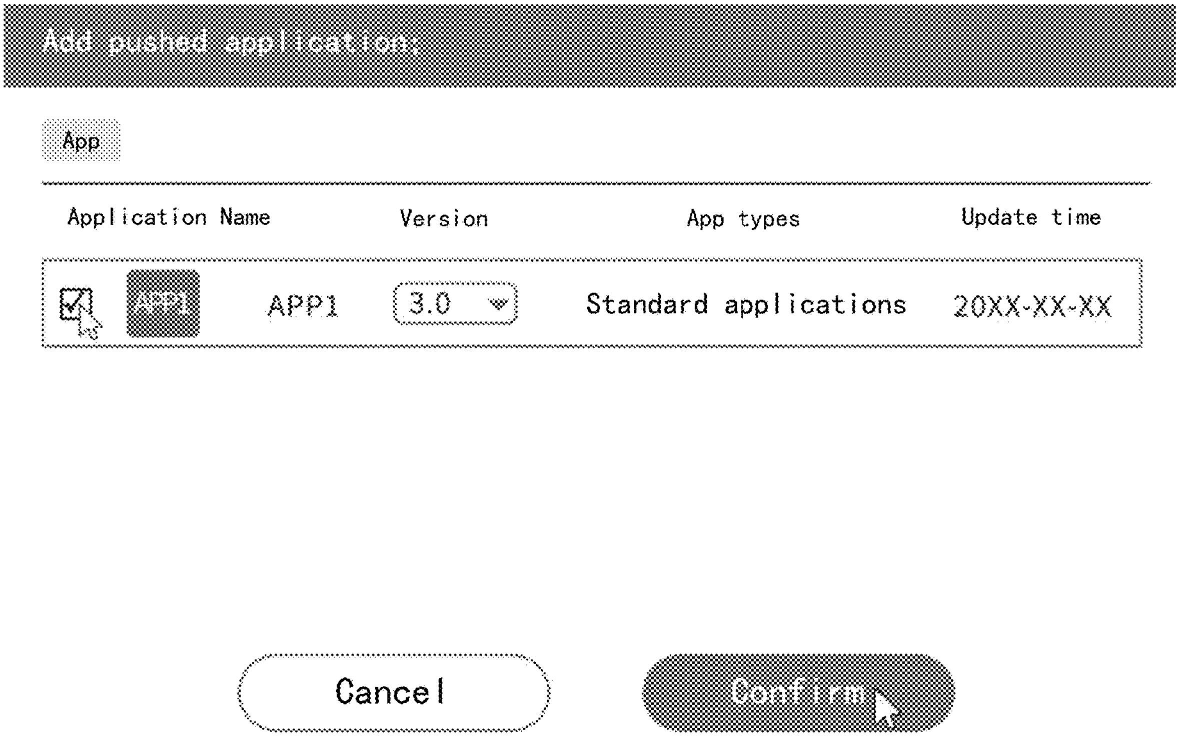

As shown in FIG. 3 (*a*), the schematic interface diagram of the service platform is a diagram, which can be an interface presented when a user opens and logs in through an application APP or a webpage corresponding to the service platform. The interface includes a device number of the transaction terminal, the agent information corresponding to the transaction terminal, the installed applications (such as applications APP1 and APP2), the source information of the application (third-party applications and application stores, etc.) and the version information, etc. The interface also includes a control for pushing applications and a history record of pushing applications, for example, the history record includes an application APP1 with a version number of 2.0 that has been pushed.

Exemplarily, the service platform receives an instruction input by the owner of the transaction terminal by clicking on the "push application" control; based on the instruction, the service platform jumps to the interface shown in FIG. 3 (*b*), which may include a higher version of the application, such as an application APP1 with a version number of 3.0, which is higher than the version of the installed APP1. After the service platform receives the user's instruction by clicking on a selected control and determining the instruction of the control, it sends the upgrade request to the client to push the new version of the application program.

Figure 4:
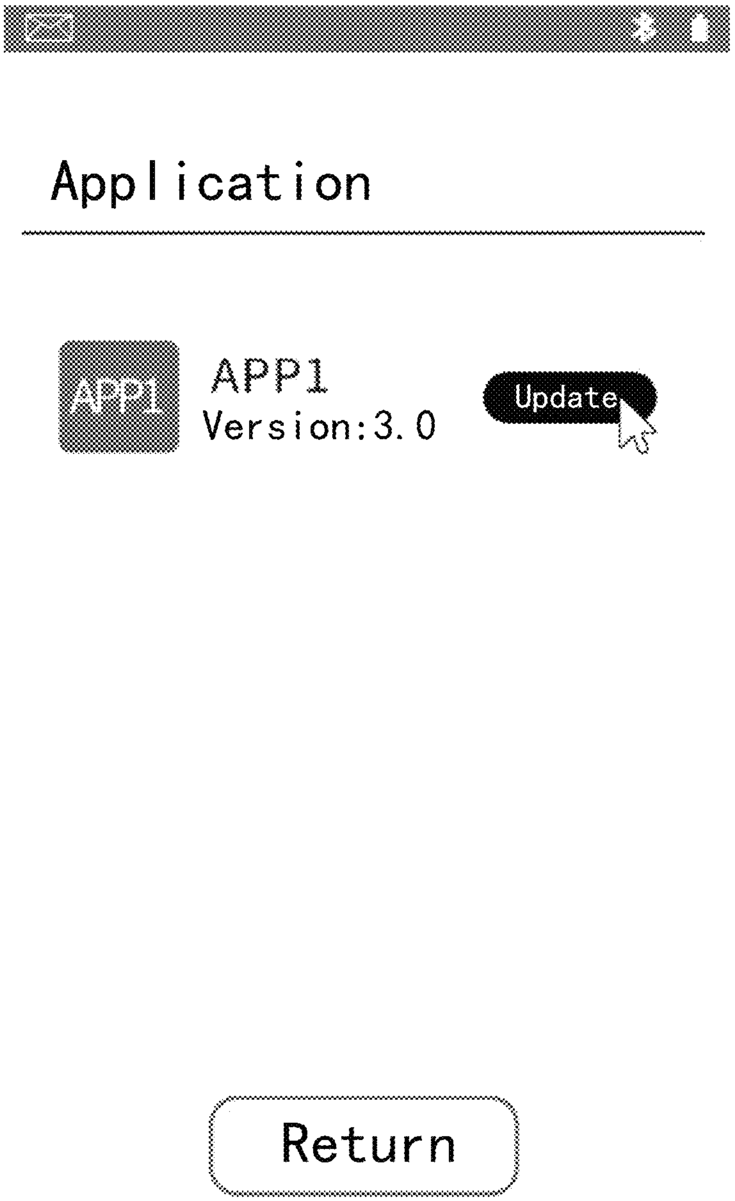
FIG. 4 is a schematic interface diagram for triggering software upgrade provided by an embodiment of the present application.

For example, the interface diagram for triggering an upgrade as shown in FIG. 4 may be an interface diagram of the transaction terminal. The service platform may also push a new version of the application program to a designated transaction terminal in real time. After receiving the push message, the transaction terminal may display the interface as shown in FIG. 4, prompting that there is a new version of the application program that can be upgraded, such as the application APP1 with a version number of 3.0 in FIG. 4. The transaction terminal may receive an instruction input by a user by clicking on an update control, and the transaction terminal may execute the application upgrade logic according to the instruction, or send update information to the service platform according to the instruction, and the client may receive the upgrade request pushed by the service platform based on the update information.

It should be noted that the interfaces shown in FIGS. 3 and 4 above are only exemplary illustrations. In a display interface of the push application corresponding to the service platform, when adding a pushed application, multiple new versions of the application program can also be selected at the same time, so that the client can receive multiple corresponding upgrade requests at the same time.

In some embodiments, the upgrade request may include an upgraded version of the software to be upgraded; after the client receives the upgrade request sent by the service platform, the method further includes:

the client downloading the installation package of the upgraded version corresponding to each upgrade request respectively according to one or more upgrade requests; the client querying the software to be upgraded on the transaction terminal according to the application package name of the software to be upgraded; and invoking the query interface corresponding to the software to be upgraded, and sending the upgrade query instruction to the transaction terminal.

In one embodiment, the installation package is used to upgrade the software to be upgraded in the transaction terminal based on a unified installation interface.

Exemplarily, the client may receive multiple upgrade requests pushed by the service platform for multiple new versions of application programs; after receiving the upgrade requests, the client downloads the installation package of the corresponding application program according to the upgrade version information in the upgrade requests. The upgrade request may also include the application package name corresponding to the software to be upgraded, or the application package of the software to be upgraded is stored in the client. Therefore, the client may query the software to be upgraded on the transaction terminal according to the application package name of the software to be upgraded, and then call the query interface corresponding to the query update service in the software to be upgraded, and send an upgrade query instruction to the transaction terminal.

In one embodiment, the upgrade query instruction is used to call the query update service integrated in the software to be upgraded in the transaction terminal, so as to instruct the transaction terminal to obtain the query result according to a determination method in the execution query update service. The software to be upgraded can be an application developed by a third party. The upgrade query instruction sent by the client is for the internal logic in the software to be upgraded, not the user of the transaction terminal. The entire query process does not require user intervention, and does not need to wait for any user input. All processes are performed in the background of the transaction terminal, and the terminal user is not aware of it.

Exemplarily, the installation package can be used by the client to install the upgraded version of the application program to multiple models of transaction terminals by invoking a unified installation interface, and upgrade the software to be upgraded in the transaction terminal. In one embodiment, the unified installation interface on the client can be a unified specification defined by the service platform, and the transaction terminals of different manufacturers can implement the function of silently installing the upgraded version of the application program according to the unified specification. In one embodiment, compared with an ordinary installation, a silent installation will not pop up any confirmation box to wait for user's operation, and all installation processes are silently executed in the background; while for ordinary installation of an application, each time the installation is executed, a pop-up box will be displayed to wait for the user's confirmation. The embodiment of the present application further improves the user experience.

Exemplarily, when the service platform or the transaction terminal triggers an update condition, the client can simultaneously download multiple installation packages based on the triggered upgrade request, and query the old version of the application (i.e., the software to be upgraded) installed on the transaction terminal according to the application package names of the multiple installation packages. While confirming that the transaction terminal has installed the old version of the application, it will also query whether the old version of the application has integrated the function of the upgrade inquiry service in a software development kit; if the transaction terminal has installed the old version of the application, and the upgrade inquiry service in the software development kit is integrated in the old version of the application, an upgrade inquiry instruction is sent to the transaction terminal.

S202, the client receives the query result fed back by the transaction terminal, which is generated by the transaction terminal executing the upgrade query instruction through the software tool development kit integrated in the software to be upgraded.

In some embodiments, the software to be upgraded in the transaction terminal may be integrated with the software development kit, and the software development kit includes an inquiry update service. The inquiry update service may implement a method interface for determining whether the software to be upgraded is in a transaction or busy state.

In one embodiment, after the client sends the upgrade inquiry instruction to the transaction terminal, a cross-process interaction method and a method for generating authentication credentials of the software development kit integrated with the software to be upgraded in the transaction terminal can be called; therefore, the transaction terminal executes the cross-process interaction method and the method for generating authentication credentials in the background based on the upgrade inquiry instruction to respond to the upgrade inquiry instruction of the client. When the transaction terminal executes various methods in the software development kit integrated with the software to be upgraded, they can all be executed based on a general security algorithm, and the service platform can generate a corresponding security key for each application.

Exemplarily, after the client sends an upgrade query instruction to the transaction terminal, the client receives the query result generated by the transaction terminal according to the business logic of the software to be upgraded by invoking the determination interface of the software to be upgraded in the transaction terminal.

S203, the client determines whether to upgrade the software to be upgraded in the transaction terminal according to the query result.

In some embodiments, the client sends the upgrade inquiry instruction to the transaction terminal, inquiring whether the status of the software to be upgraded in the transaction terminal is a transaction or busy state. If the software to be upgraded is in the transaction state, a multiple inquiry mechanism is enabled. If it is in an idle state, the application upgrade and the installation package are executed.

In some embodiments, the query result may include a response result and an authentication credential, and the client determines whether to upgrade the software to be upgraded in the transaction terminal according to the query result, including:

the client verifying the authentication credential by invoking the authentication interface of the service platform; if the authentication credential is passed, it is determined whether to upgrade the software to be upgraded in the transaction terminal according to a response result; if the authentication credential is not passed, the software to be upgraded in the transaction terminal is upgraded.

In one embodiment, the response result and the authentication credential are respectively generated by the transaction terminal based on the cross-process interaction method and the credential generation method in the software tool development kit.

Exemplarily, after receiving the query result, the client will call the interface of the service platform to verify whether the authentication credential in the query result is legal; if the authentication credential is illegal and fails to pass the verification, the old version of the software installed in the transaction terminal may have illegal software occupying the package name or the software is cracked, so the software to be upgraded in the transaction terminal is directly upgraded according to the new version of the installation package; if the authentication credential is legal and passes the verification, then continue to determine whether to upgrade the software to be upgraded in the transaction terminal according to the response result.

In some embodiments, determining whether to upgrade the software to be upgraded in the transaction terminal according to the response result includes:

if the response result is update, the software to be upgraded in the transaction terminal is upgraded; if the response result is no update, the multiple inquiry mechanism is started, and the multiple inquiry mechanism is used to send the upgrade inquiry instruction to the transaction terminal again after a preset time.

Exemplarily, if the response result is update, the software to be upgraded of the transaction terminal is directly upgraded; if the response result is that the transaction is in progress or is busy and cannot be updated, the installation package is retained and the software to be upgraded is waited for to process its own logic (such as saving transaction data, etc.), and then the multiple inquiry mechanism is started.

Specifically, since the inquiry is triggered by the client, the client is responsible for controlling the inquiry strategy. If the authentication information returned by the software to be upgraded of the transaction terminal is verified and the returned response result cannot be updated, the client will re-inquire once every minute. When the update cannot be made after 10 inquiries, the inquiry frequency will be reduced according to the strategy (such as reducing it to once an hour). When the transaction terminal returns that the update can be made, the multiple inquiry mechanism will be restored to the initial state. At the same time, if the authentication credential is verified, the client will also cache the verification result. Starting from the second inquiry, it will no longer initiate a network request to call the interface API to repeatedly verify the authentication credential. The operation of whether to update is directly executed according to a result of the first verification, thereby achieving the purpose of saving traffic.

In addition, when the client is used as the code module integrated in the transaction terminal, the transaction terminal is the only execution subject of the entire interactive process, and the entire process of the embodiment of the present application can be carried out inside the transaction terminal (such as a POS terminal), without the need for additional hardware and equipment, effectively preventing the possibility that information (such as query results, input passwords, etc.) may be stolen or even tampered with by other applications or other devices in other devices during multi-terminal interaction. A safe platform authentication method is used to prevent a problem of illegal software occupying the package name or the software being cracked and unable to upgrade normally.

In some embodiments, the client upgrades the software to be upgraded in the transaction terminal, including:

the client calculating the difference in binary data between the installation package of the upgraded version and the installation package of the old version corresponding to the software to be upgraded through a binary file difference algorithm; generating a difference file according to the difference in binary data; the difference file being used to instruct the transaction terminal to synthesize an upgraded installation package according to the installation package of the old version and the difference file, and to upgrade the software to be upgraded according to the upgraded installation package.

Exemplarily, the client uses the binary file difference algorithm to calculate the difference in binary data between the installation package of the upgraded version and the installation package of the old version through a binary file difference algorithm, and then generates the difference file based on the difference and downloads the difference file to the transaction terminal. The transaction terminal synthesizes the latest installation package of the upgraded version based on the installed old version of the installation package and the difference file, and finally installs the installation package of the upgraded version to achieve the purpose of software update. By the embodiment of the present application, it is not necessary for each software to customize its own file comparison list, and it can be applied to the update and upgrade of all software packages, so that it has uniformity and versatility in implementation.

In one embodiment, there are many kinds of differential algorithms that can be used. Different differential algorithms differ in an efficiency of calculating differential files, a size of generated differential files, and an efficiency of synthesis. The differential algorithms can be selected according to the needs of actual application scenarios.

In some embodiments, the method further includes:

based on cross-process communication, the client sending the upgrade inquiry instruction to the transaction terminal through a first thread; the client verifies the authentication credential in the query result through a second thread and determining whether to upgrade the software to be upgraded.

In one embodiment, the second thread may be a process that downloads the installation package of the upgraded version before the first thread.

Exemplarily, the client uses a multi-threaded and messenger communication method to start a thread from the thread pool for downloading and installing each application. A query part of the cross-process communication initiates an upgrade query instruction to the corresponding old version of the software to be upgraded through the messenger according to the package name of the application package, and then returns the query results of each software to be upgraded to the previous thread corresponding to the software to be upgraded to perform authentication and installation; if the query result is verified and the software to be upgraded in the transaction terminal is busy (the response result returned is not updated), the verification result is cached, and the next update is waited according to the multiple query mechanism. There is no mutual dependency between the threads, so that multiple software can be queried and upgraded at the same time.

In the embodiment of the present application, the client can ensure the thread safety of the cross-process communication of the software to be upgraded in the client and the transaction terminal by adopting the communication mode of android messenger. The client will not affect each other in the process of updating multiple software at the same time. For the thread safety for querying and returning results, through the communication mode based on android messenger, data will not be shared between different threads. The inquiry process is controlled and triggered by the client, and one result is inquired each time in a queue. The third-party application to be upgraded in the transaction terminal is the inquired party, and there will be no high concurrency scene inside it. Therefore, while supporting multiple software to inquire and upgrade at the same time, thread safety can also be guaranteed.

In some embodiments, the client synchronizes the upgrade results to the service platform, and the upgrade results include upgrade success and upgrade failure.

Exemplarily, if the software to be upgraded can be updated and upgraded normally, the client will directly synchronize the result of successful upgrade with the service platform; if the software to be upgraded is in the transaction state during the update inquiry process and the update and upgrade cannot be executed, the client will continue to inquire next time according to the multiple inquiry mechanism until all inquiries cannot be satisfied, and the client will directly synchronize the result of failed upgrade with the service platform.

By the present application embodiment, the original transaction state can be broken, which only belongs to the business logic of the payment application itself. The invisible constraints of other applications can make the transaction status of the payment application known to the client of managing the transaction terminal before the application is upgraded. However, the traditional application management platform does not consider whether the application itself is in an idle state when upgrading the application, therefore, the loss of transaction data due to the upgrade can be avoided.

In addition, when the android platform usually executes the process of application upgrade, the system directly installs and updates, and does not consider whether there are affairs being processed inside the application (for example, transactions are in progress, transaction data is not saved, etc.). At this time, hastily installing and updating will often cause the transaction data still in the memory part (not persisted) to be lost, and cause losses. By the embodiment of the present application, the client inquires about the updated solution, when executing the update, the software to be upgraded will execute the business logic program preset by a developer, and determine whether unsaved transaction data is returned. If the unsaved transaction data is returned, it will return a prompt that the transaction is in progress and cannot be updated. When the client receives the response result, it will wait for the next inquiry according to the multiple inquiry mechanism, until the application processes and saves all important data and returns that it can be updated, the update operation will be executed; thereby, it can avoid interrupting the user's transaction process, and upgrade when idle, and the upgrade experience is also more friendly. Through the software tool development kit integrated in the software to be upgraded, the payment application can support the function of inquiring about the upgrade, without having to consider specific cross-process communication and complex inquiry strategies and installation logic; based on a completely open and customized payment status return interface, all payment applications can meet various payment scenarios.

Figure 6:
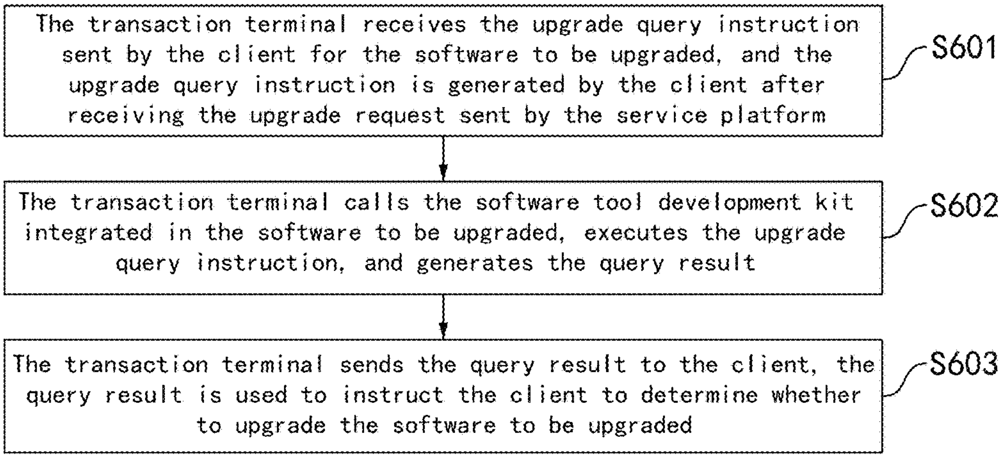
FIG. 6 is a schematic flow chart of the implementation of the software upgrade method provided by an embodiment of the present application.

In combination with the implementation of the above embodiment, the embodiment of the present application also provides a software upgrade method. As shown in FIG. 6, the execution subject of the software upgrade method can be the transaction terminal. Based on the call from the client, the transaction terminal can execute the method of the software development kit integrated in the software to be upgraded to realize the judgment of its own operating logic and the response to the client. The specific implementation steps may include following steps.

S601, the transaction terminal receives the upgrade query instruction sent by the client for the software to be upgraded, and the upgrade query instruction is generated by the client after receiving the upgrade request sent by the service platform. The step is the same as the implementation principle of the above embodiment, and will not be repeated here.

S602, the transaction terminal calls the software tool development kit integrated in the software to be upgraded, executes the upgrade query instruction, and generates the query result.

Exemplarily, the software installed in the transaction terminal may include an application developed by the third party or an application in an application market. The software development kit is provided by the client for integration in a third party application. The software development kit may include a communication service that has been implemented to respond to client inquiries for upgrades.

Exemplarily, for the applications on the service platform and their corresponding developers, the client can provide a packaged software development kit (SDK) for integration into third-party applications; so that the integrated third-party applications can have functions such as querying updates, downloading parameters, synchronizing accessory device information, uploading business data, and pushing cloud messages.

Exemplarily, in the process of integrating the above SDK into the application, the developer only needs to call StoreSdk.initInquirer ( ) method, and then the transaction terminal can implement the isReadyUpdate ( ) method according to the application's own business logic, and feedback the corresponding query result (the determination rules of the business logic of each application may be different). Before updating the software to be upgraded, the client calls the inquiry update service integrated with the software to be upgraded in the transaction terminal, and the SDK inherited by the upgraded software internally executes the isReadyUpdate ( ) method and returns the response result and the authentication credential in the query result to the client. The client returns the decision of whether to execute the update operation based on the method.

In one embodiment, in the interactive process, the user of the transaction terminal does not need to participate manually. The client will automatically interact with the query update service in the SDK integrated with the third-party application in the transaction terminal in the background.

In some embodiments, the software development kit further includes an authentication key, and the query result includes a response result and an authentication credential. the transaction terminal calls the software development kit integrated in the software to be upgraded, executes the upgrade query instruction, and generates a query result, including:

invoking the cross-process interaction method in the software tool development kit, executing the upgrade query instruction, and generating the response result; invoking the credential generation method in the software tool development kit, and generating the authentication credential according to the authentication key.

In one embodiment, the authentication key is generated by the service platform for the development software. The authentication credential is used by the client to verify the old version of the software to be upgraded. The response result is used by the client to determine whether to upgrade the software to be upgraded after the authentication credential corresponding to the old version is verified.

In some embodiments, when a developer creates an application in the application market, the service platform can generate an authentication key (Key and Secret key pair) for each application. When the developer integrates the SDK in the application, the corresponding authentication key is written in the code. During the inquiry process, when the upgraded software of the transaction terminal is started, the integrated SDK will initialize the authentication key; when authentication is required, the SDK uses the authentication key to generate the authentication credential (such as a signature token), and returns the authentication credential to the client. After the client transmits the authentication credential to the service platform, the service platform verifies the authentication credential based on the software corresponding to the authentication credential. Therefore, it can be determined whether the old version of the software currently installed on the transaction terminal has been cracked or the package name has been maliciously occupied based on the signature verification result, and the transaction terminal can be further updated to the genuine application.

Figure 5:
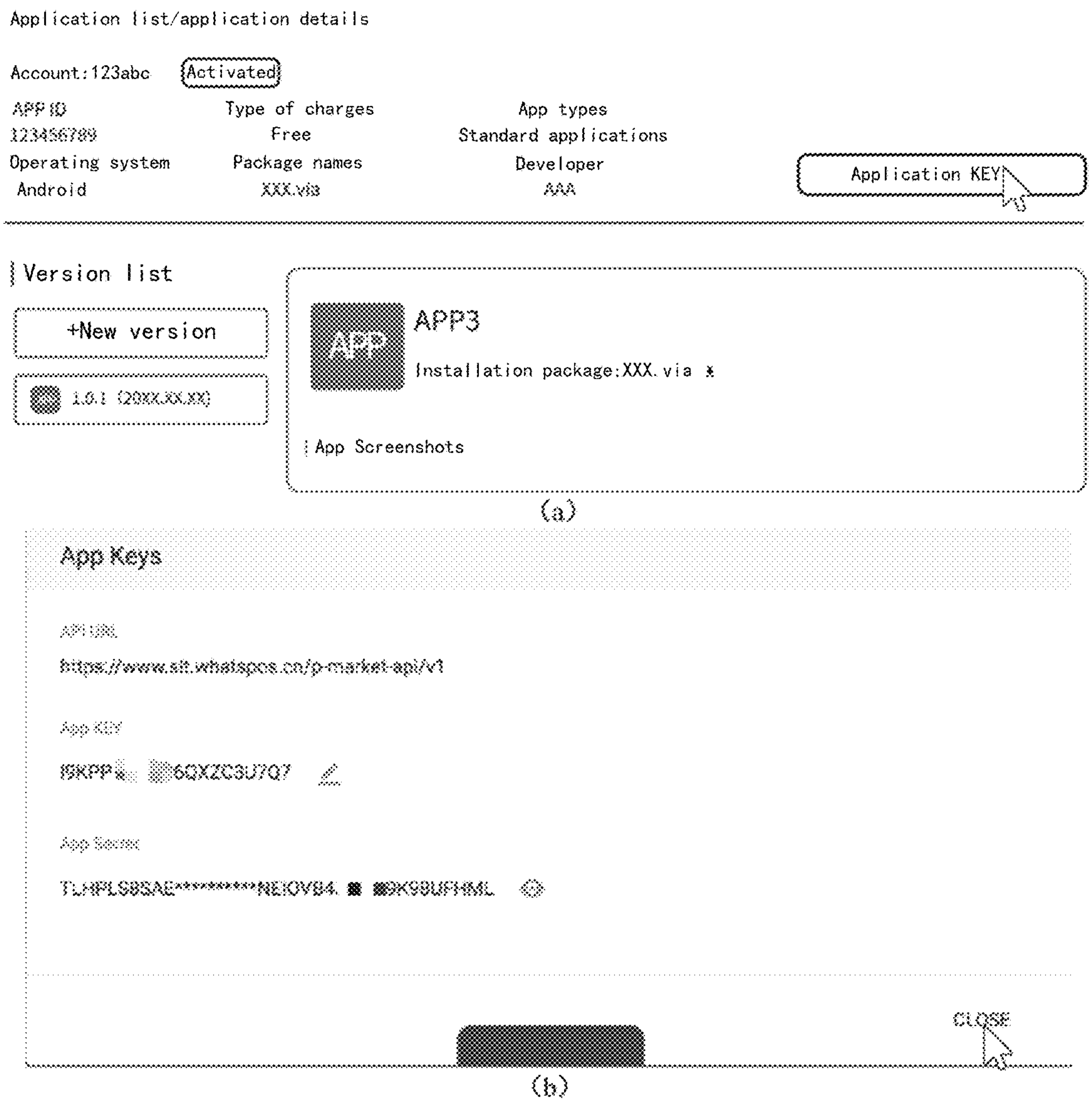
FIG. 5 is a schematic interface diagram for generating authentication keys provided by an embodiment of the present application.

Exemplarily, when a developer develops and creates an application on the service platform, the application obtains the AppKey and AppSecret for authenticating the application, and then integrates the client SDK's inquiry upgrade service in the application according to the usage document. During the integration process, the AppKey and AppSecret corresponding to the application will be pre-buried. As shown in the display interface of the service platform in FIG. 5, when the developer creates an application on the service platform, the service platform will automatically generate the corresponding AppKey and AppSecret for each application. The developer can view the AppKey and AppSecret through the developer center→application management→select the application path and click "APP KEYS" (application KEY), as shown in FIG. 5 (*a*); after receiving the instruction input by the user by clicking "application KEY", the service platform displays the interface shown in FIG. 5 (*b*), which displays the interface address API URL corresponding to the application and the authentication key (APP KEY and APP Secret) and other information. Specifically, the developer writes the AppKey and AppSecret in the code of the application and completes the initialization of the authentication key by invoking the initialization method of the SDK.

S603, the transaction terminal sends the query result to the client, the query result is used to instruct the client to determine whether to upgrade the software to be upgraded. The step is the same as the implementation principle of the above embodiment, and will not be repeated here.

By the embodiments of the present application, malicious return of query results can be effectively prevented. The inquiry upgrade scheme in the embodiments of the present application adopts a service platform to generate a key, and is verified by the service platform. The query result will include signature information (i.e., authentication credentials) generated based on the authentication key of the old version of the application, which effectively prevents the software to be upgraded from being cracked or maliciously occupying the package name, etc., resulting in the software being unable to be upgraded to the correct version. Since the cracker cannot obtain the original key of the application, there is no way to refuse the owner of the transaction terminal from upgrading the application software to the genuine software, thereby ensuring the security of the software upgrade process and the security of the software installed in the transaction terminal.

It should be understood that the size of the sequence number of each step in the above embodiment does not mean the order of execution. The execution order of each process should be determined by its function and internal logic, and should not constitute any limitation on the implementation process of the embodiment of the present application.

Figure 7:
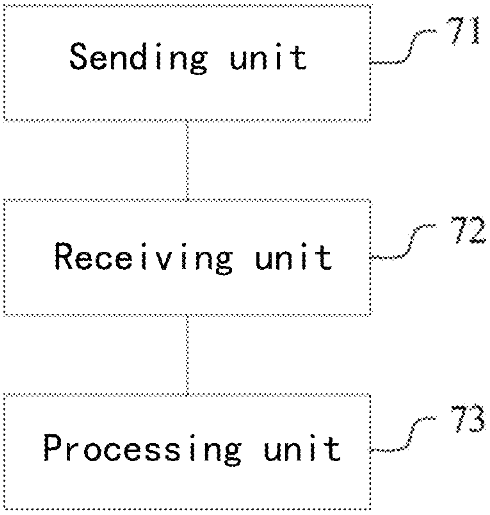
FIG. 7 is a schematic structural diagram of a software upgrade device provided by an embodiment of the present application.

Corresponding to the software upgrade method described in the above embodiment, FIG. 7 shows a structural block diagram of the software upgrade device provided in the embodiment of the present application. For ease of explanation, only the part related to the embodiment of the present application is shown.

Referring to FIG. 7, the device includes following software or hardware components.

A sending unit 71, is used to send an upgrade inquiry instruction to a transaction terminal after receiving an upgrade request sent by a service platform.

A receiving unit 72, is used to receive a query result fed back by the transaction terminal, and the query result is generated by the transaction terminal executing the upgrade inquiry instruction through a software tool development kit integrated in the software to be upgraded.

A processing unit 73, is used to determine whether to upgrade the software to be upgraded in the transaction terminal according to the query result.

Corresponding to the software upgrade method described in the above embodiment, the structural block diagram of the software upgrade device provided in the embodiment of the present application only shows the part related to the embodiment of the present application for the convenience of explanation.

The device further includes following software or hardware components.

A receiving unit, is used to receive an upgrade query instruction sent by a client for the software to be upgraded, and the upgrade query instruction is generated by the client after receiving an upgrade request sent by the service platform.

An execution unit, is used to call a software tool development kit integrated in the software to be upgraded, execute the upgrade query instruction, and generate a query result.

A sending unit, is used to send the query result to the client, and the query result is used to instruct the client to determine whether to upgrade the software to be upgraded.

It should be noted that the information interaction, execution process and other contents between the above-mentioned devices/units are based on the same concept as the method embodiment of the present application. Their specific functions and technical effects can be found in the method embodiment section and will not be repeated here.

Those skilled in the art can clearly understand that, for the convenience and simplicity of description, only the division of the above-mentioned functional units and modules is used for example. In practical applications, the above-mentioned function distribution can be completed by different functional units and modules as needed, that is, the internal structure of the device is divided into different functional units or modules to complete all or part of the functions described above. Each functional unit and module in the embodiment can be integrated in a processing unit, or each unit can exist physically alone, or two or more units can be integrated in one unit, and the above-mentioned integrated unit can be implemented in the form of hardware or in the form of software functional units. In addition, the specific names of each functional unit and module are only for the convenience of distinguishing from each other, and are not used to limit the scope of protection of the present application. The specific working process of the unit and module in the above-mentioned system can refer to the corresponding process in the foregoing method embodiments, and will not be repeated here.

An embodiment of the present application also provides a computer-readable storage medium, and the computer-readable storage medium stores a computer program. When the computer program is executed by a processor, it can implement the steps in the above-mentioned method embodiments.

An embodiment of the present application provides a computer program product. When the computer program product runs on a mobile terminal, the mobile terminal can implement the steps in the above-mentioned various method embodiments when executing the computer program product.

Figure 8:
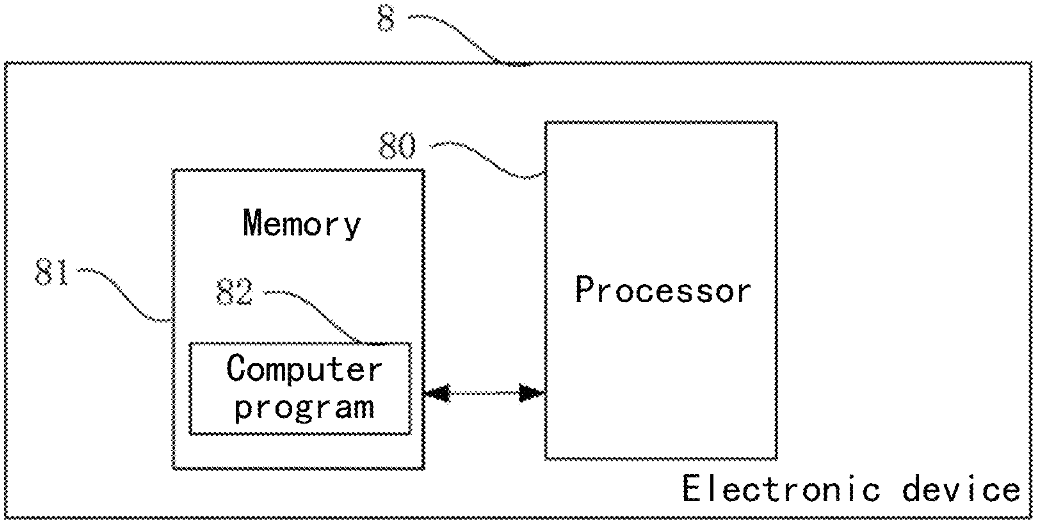
FIG. 8 is a schematic structural diagram of an electronic device provided by an embodiment of the present application.

FIG. 8 is a schematic structure diagram of an electronic device 8 provided in an embodiment of the present application. As shown in FIG. 8, the electronic device 8 of the embodiment includes: at least one processor 80 (only one processor is shown in FIG. 8), a memory 81, and a computer program 82 stored in the memory 81 and executable on the at least one processor 80. When the processor 80 executes the computer program 82, the steps in the above embodiment are implemented.

The electronic device 8 may be a computing device such as a desktop computer, a notebook, a palm computer, and a cloud server. The electronic device 8 may include, but is not limited to, a processor 80 and a memory 81. Those skilled in the art will appreciate that FIG. 8 is merely an example of the electronic device 8 and does not constitute a limitation on the electronic device 8. The electronic device 8 may include more or fewer components than shown in the figure, or may combine certain components, or different components, and may also include input and output devices, network access devices, etc.

The processor 80 may be a central processing unit (CPU), or other general-purpose processors, digital signal processors (DSP), application-specific integrated circuits (ASIC), field-programmable gate arrays (FPGA), or other programmable logic devices, discrete gates or transistor logic devices, discrete hardware components, etc. A general-purpose processor may be a microprocessor or any conventional processor, etc.

The memory 81 may be an internal storage unit of the electronic device 8 in some embodiments, such as a hard disk or memory of the electronic device 8. The memory 81 may also be an external storage device of the electronic device 8 in other embodiments, such as a plug-in hard disk, a smart memory card (SMC), a secure digital (SD) card, a flash card (Flash Card), equipped on the electronic device 8. Further, the memory 81 may also include both an internal storage unit of the electronic device 8 and an external storage device. The memory 81 is used to store an operating system, an application program, a BootLoader, data and other programs, such as the program code of the computer program, etc. The memory 81 may also be used to temporarily store data that has been output or is to be output.

If the integrated unit is implemented in the form of a software functional unit and sold or used as an independent product, it can be stored in a computer-readable storage medium. Based on this understanding, the present application implements all or part of the processes in the above-mentioned embodiment method, which can be completed by instructing the relevant hardware through a computer program. The computer program can be stored in a computer-readable storage medium. When the computer program is executed by the processor, the steps of the above-mentioned various method embodiments can be implemented. In one embodiment, the computer program includes computer program code, and the computer program code can be in source code form, object code form, executable file or some intermediate form. The computer-readable medium can at least include: any entity or device that can carry the computer program code to the camera/terminal device, recording medium, computer memory, read-only memory (ROM), random access memory (RAM), electric carrier signal, telecommunication signal and software distribution medium. For example, a USB flash drive, a mobile hard disk, a magnetic disk or an optical disk. In some jurisdictions, according to legislation and patent practice, computer-readable media cannot be electric carrier signals and telecommunication signals.

In the above embodiments, the description of each embodiment has its own emphasis. For the parts that are not described or recorded in detail in a certain embodiment, reference can be made to the relevant descriptions of other embodiments.

Those of ordinary skill in the art will appreciate that the units and algorithmic steps of each example described in conjunction with the embodiments disclosed herein can be implemented with a combination of electronic hardware or computer software and electronic hardware. Whether these functions are performed in hardware or software mode depends on the specific application and design constraints of the technical solution. Professional and technical personnel can use different methods to implement the described functions for each specific application, but this implementation should not be considered to exceed the scope of the application.

In the embodiment provided by the application, it should be understood that the disclosed device/network equipment and method can be realized by other modes. For example, the device/network equipment embodiment described above is only schematic, for example, the division of described module or unit is only a kind of logical function division, and other division mode can be arranged during actual implementation, for example, multiple units or components can be combined or can be integrated into another system, or some features can be ignored, or do not execute. Another point, the mutual coupling or direct coupling or communication connection shown or discussed can be through some interfaces, the indirect coupling or communication connection of device or unit can be electrical, mechanical or other form.

The units described as separate components may or may not be physically separated, and the components displayed as units may or may not be physical units, i.e., they may be located in one place, or they may be distributed on multiple network units. Some or all of the units may be selected according to actual needs to achieve the purpose of the present embodiment.

The above-described embodiments are only used to illustrate the technical solutions of the present application, rather than to limit them. Although the present application has been described in detail with reference to the foregoing embodiments, a person of ordinary skill in the art should understand that the technical solutions described in the aforementioned embodiments can still be modified, or some of the technical features thereof can be replaced by equivalents. However, these modifications or replacements do not deviate the essence of the corresponding technical solutions from the spirit and scope of the technical solutions of the embodiments of the present application, and should all be included in the protection scope of the present application.

What is claimed is:

1. A software upgrade method, applied to an electronic device, the method comprising:

after receiving an upgrade request sent by a service platform, sending an upgrade query instruction to a transaction terminal, comprising: sending the upgrade query instruction to the transaction terminal by a first thread according to a cross-process communication;

receiving a query result fed back by the transaction terminal, the query result being generated by executing the upgrade query instruction on the transaction terminal using a software tool development kit integrated in the software to be upgraded; and determining whether to upgrade the software to be upgraded in the transaction terminal according to the query result, comprising: verifying an authentication credential in the query result and determining whether to upgrade the software to be upgraded by using a second thread, which is a process that downloads the installation package of the upgraded version before the first thread.

2. The method according to claim 1, wherein the upgrade request comprises an upgraded version of the software to be upgraded, after receiving the upgrade request sent by the service platform, the method further comprises:

according to one or more upgrade requests, downloading an installation package of the upgraded version corresponding to each upgrade request respectively;

according to an application package name of the software to be upgraded, querying the software to be upgraded on the transaction terminal;

invoking a query interface corresponding to the software to be upgraded, and sending the upgrade query instruction to the transaction terminal, wherein the installation package is used to upgrade the software to be upgraded in the transaction terminal according to a unified installation interface.

3. The method according to claim 1, wherein the query result comprises a response result and an authentication credential, determining whether to upgrade the software to be upgraded in the transaction terminal according to the query result further comprises:

verifying the authentication credential by invoking an authentication interface of the service platform;

in response that the authentication credential passes, determining whether to upgrade the software to be upgraded in the transaction terminal according to the response result;

in response that the authentication credential fails, upgrading the software to be upgraded in the transaction terminal, wherein the response result and the authentication credential are respectively generated by the transaction terminal according to the cross-process interaction method and the credential generation method in the software tool development kit.

4. The method according to claim 3, wherein determining whether to upgrade the software to be upgraded in the transaction terminal according to the query result further comprises:

in response that the response result indicates to update, upgrading the software to be upgraded in the transaction terminal;

in response that the response result indicates not to update, starting a multiple inquiry mechanism, which is used to send the upgrade inquiry instruction to the transaction terminal again after a preset time.

5. The method according to claim 3, wherein upgrading the software to be upgraded in the transaction terminal further comprises:

calculating a difference in binary data between an installation package of the upgraded version and an installation package of an older version corresponding to the software to be upgraded by a binary file difference algorithm;

generating a difference file according to the difference in binary data, wherein the difference file is used to instruct the transaction terminal to synthesize an upgrade installation package according to the installation package of the old version and the difference file, and upgrade the software to be upgraded according to the upgrade installation package.

6. A software upgrade method, the method comprising:

receiving an upgrade query instruction sent by a client for a software to be upgraded, wherein the upgrade query instruction is generated by the client after receiving the upgrade request sent by a service platform and the client sends the upgrade query instruction to a transaction terminal by a first thread according to a cross-process communication;

invoking a software tool development kit integrated in the software to be upgraded, and executing the upgrade query instruction, and generating a query result;

sending the query result to the client, wherein the query result is used to instruct the client to verify an authentication credential in the query result and determine whether to upgrade the software to be upgraded by using a second thread, which is a process that downloads the installation package of the upgraded version before the first thread.

7. The method according to claim 6, wherein a software development kit also includes an authentication key, and the query result comprises a response result and an authentication credential, invoking the software tool development kit integrated in the software to be upgraded, and executing the upgrade query instruction, and generating the query result further comprises:

invoking a cross-process interaction method in the software tool development kit, and executing the upgrade query instruction, and generating the response result;

invoking a credential generation method in the software tool development kit, and generating the authentication credential according to the authentication key, wherein the authentication key is generated by the service platform for a development software, and the authentication credential is used by the client to verify a older version of the software to be upgraded, and the response result is used by the client to determine whether to upgrade the software to be upgraded after the authentication credential corresponding to the older version is verified.

8. An electronic device, comprising:

a memory storing at least one instruction;

a processor, when the at least one instruction is executed by the processor, the processor is caused to:

after receiving an upgrade request sent by a service platform, send an upgrade query instruction to a transaction terminal, wherein the processor sends the upgrade query instruction to the transaction terminal by a first thread according to a cross-process communication;

receive a query result fed back by the transaction terminal, the query result being generated by executing the upgrade query instruction on the transaction terminal using a software tool development kit integrated in the software to be upgraded; and determine whether to upgrade the software to be upgraded in the transaction terminal according to the query result, wherein the processor verifies an authentication credential in the query result and determines whether to upgrade the software to be upgraded by using a second thread, which is a process that downloads the installation package of the upgraded version before the first thread.

9. The electronic device according to claim 8, wherein the upgrade request comprises an upgraded version of the software to be upgraded, after receiving the upgrade request sent by the service platform, the processor further:

according to one or more upgrade requests, downloads an installation package of the upgraded version corresponding to each upgrade request respectively;

according to an application package name of the software to be upgraded, queries the software to be upgraded on the transaction terminal;

invokes a query interface corresponding to the software to be upgraded, and send the upgrade query instruction to the transaction terminal, wherein the installation package is used to upgrade the software to be upgraded in the transaction terminal according to a unified installation interface.

10. The electronic device according to claim 8, wherein the query result comprises a response result and an authentication credential, the processor determines whether to upgrade the software to be upgraded in the transaction terminal according to the query result by:

verifying the authentication credential by invoking an authentication interface of the service platform;

in response that the authentication credential passes, determining whether to upgrade the software to be upgraded in the transaction terminal according to the response result;

in response that the authentication credential fails, upgrading the software to be upgraded in the transaction terminal, wherein the response result and the authentication credential are respectively generated by the transaction terminal according to the cross-process interaction method and the credential generation method in the software tool development kit.

11. The electronic device according to claim 10, wherein the processor determines whether to upgrade the software to be upgraded in the transaction terminal according to the query result by:

in response that the response result indicates to update, upgrading the software to be upgraded in the transaction terminal;

in response that the response result indicates not to update, starting a multiple inquiry mechanism, which is used to send the upgrade inquiry instruction to the transaction terminal again after a preset time.

12. The electronic device according to claim 10, wherein the processor upgrades the software to be upgraded in the transaction terminal by:

calculating a difference in binary data between an installation package of the upgraded version and an installation package of an older version corresponding to the software to be upgraded by a binary file difference algorithm;

generating a difference file according to the difference in binary data, wherein the difference file is used to instruct the transaction terminal to synthesize an upgrade installation package according to the installation package of the old version and the difference file, and upgrade the software to be upgraded according to the upgrade installation package.

13. The electronic device according to claim 8, wherein the processor further:

receives an upgrade query instruction sent by a client for a software to be upgraded, wherein the upgrade query instruction is generated by the client after receiving the upgrade request sent by a service platform;

invokes a software tool development kit integrated in the software to be upgraded, and executes the upgrade query instruction, and generating a query result;

sends the query result to the client, wherein the query result is used to instruct the client to determine whether to upgrade the software to be upgraded.

14. The electronic device according to claim 13, wherein a software development kit also includes an authentication key, and the query result comprises a response result and an authentication credential, the processer invoke ethe software tool development kit integrated in the software to be upgraded, and execute the upgrade query instruction, and generate the query result by:

invoking a cross-process interaction method in the software tool development kit, and executing the upgrade query instruction, and generating the response result;

invoking a credential generation method in the software tool development kit, and generating the authentication credential according to the authentication key, wherein the authentication key is generated by the service platform for a development software, and the authentication credential is used by the client to verify a older version of the software to be upgraded, and the response result is used by the client to determine whether to upgrade the software to be upgraded after the authentication credential corresponding to the older version is verified.

15. The method according to claim 2, wherein the query result comprises a response result and an authentication credential, determining whether to upgrade the software to be upgraded in the transaction terminal according to the query result further comprises:

verifying the authentication credential by invoking an authentication interface of the service platform;

in response that the authentication credential passes, determining whether to upgrade the software to be upgraded in the transaction terminal according to the response result;

in response that the authentication credential fails, upgrading the software to be upgraded in the transaction terminal, wherein the response result and the authentication credential are respectively generated by the transaction terminal according to the cross-process interaction method and the credential generation method in the software tool development kit.

16. The method according to claim 4, wherein upgrading the software to be upgraded in the transaction terminal further comprises:

calculating a difference in binary data between an installation package of the upgraded version and an installation package of an older version corresponding to the software to be upgraded by a binary file difference algorithm;

generating a difference file according to the difference in binary data, wherein the difference file is used to instruct the transaction terminal to synthesize an upgrade installation package according to the installation package of the old version and the difference file, and upgrade the software to be upgraded according to the upgrade installation package.

* * * * *